United States Patent [19]

Irby, III et al.

[11] Patent Number: 4,887,077

[45] Date of Patent: Dec. 12, 1989

[54] SUBSCRIBER INVENTORY NETWORK

[75] Inventors: George P. Irby, III, DeSoto; Stephen L. Rosenthal, Dallas, both of Tex.

[73] Assignee: Metagram Services Inc., Manhasset, N.Y.

[21] Appl. No.: 151,511

[22] Filed: Feb. 18, 1988

[51] Int. Cl.⁴ .............................................. H04Q 1/00
[52] U.S. Cl. ...................... 340/825.470; 340/825.480; 340/825.520; 455/31; 455/38
[58] Field of Search ....................... 340/825.52, 825.47, 340/825.48, 825.71, 825.72, 825.26, 825.27; 455/31, 32, 38, 68, 70; 307/272.2; 379/56, 57

[56] References Cited

U.S. PATENT DOCUMENTS

| | | |
|---|---|---|
| 3,851,251 | 11/1974 | Wigner et al. |
| 4,131,881 | 12/1978 | Robinson. |
| 4,369,443 | 1/1983 | Giallanza et al. .............. 340/825.47 |
| 4,385,398 | 5/1983 | Wycoff et al. .................. 340/825.48 |
| 4,454,509 | 6/1984 | Buennagel et al. ............. 340/825.48 |
| 4,473,824 | 9/1984 | Claytor ........................... 340/825.27 |
| 4,695,880 | 9/1987 | Johnson et al. ................. 340/825.47 |
| 4,716,410 | 12/1987 | Nozaki ........................... 340/825.52 |

Primary Examiner—Donald J. Yusko
Assistant Examiner—E. O. Pudpod
Attorney, Agent, or Firm—Gottlieb, Rackman & Reisman

[57] ABSTRACT

A subscriber inventory network provides efficient dissemination and rapid exchange of information between members. Members of the subscriber network are arranged in separate groups, with the member subscribers in each separate group being pre-qualified with respect to certain exclusive inventory categories. The receiving unit of each subscriber is selectively enabled to receive only those messages which are related to the designated inventory category, with all other messages being excluded. A message controller in each subscriber unit decodes command, address and message data bits. Two bits are dedicated for command instructions, including a distribution bit, which directs message data to a single unit in a single group, and a flash bit, which directs the encoded message data to all units in a single member group, or alternatively, to all receiving units in all member groups.

1 Claim, 2 Drawing Sheets

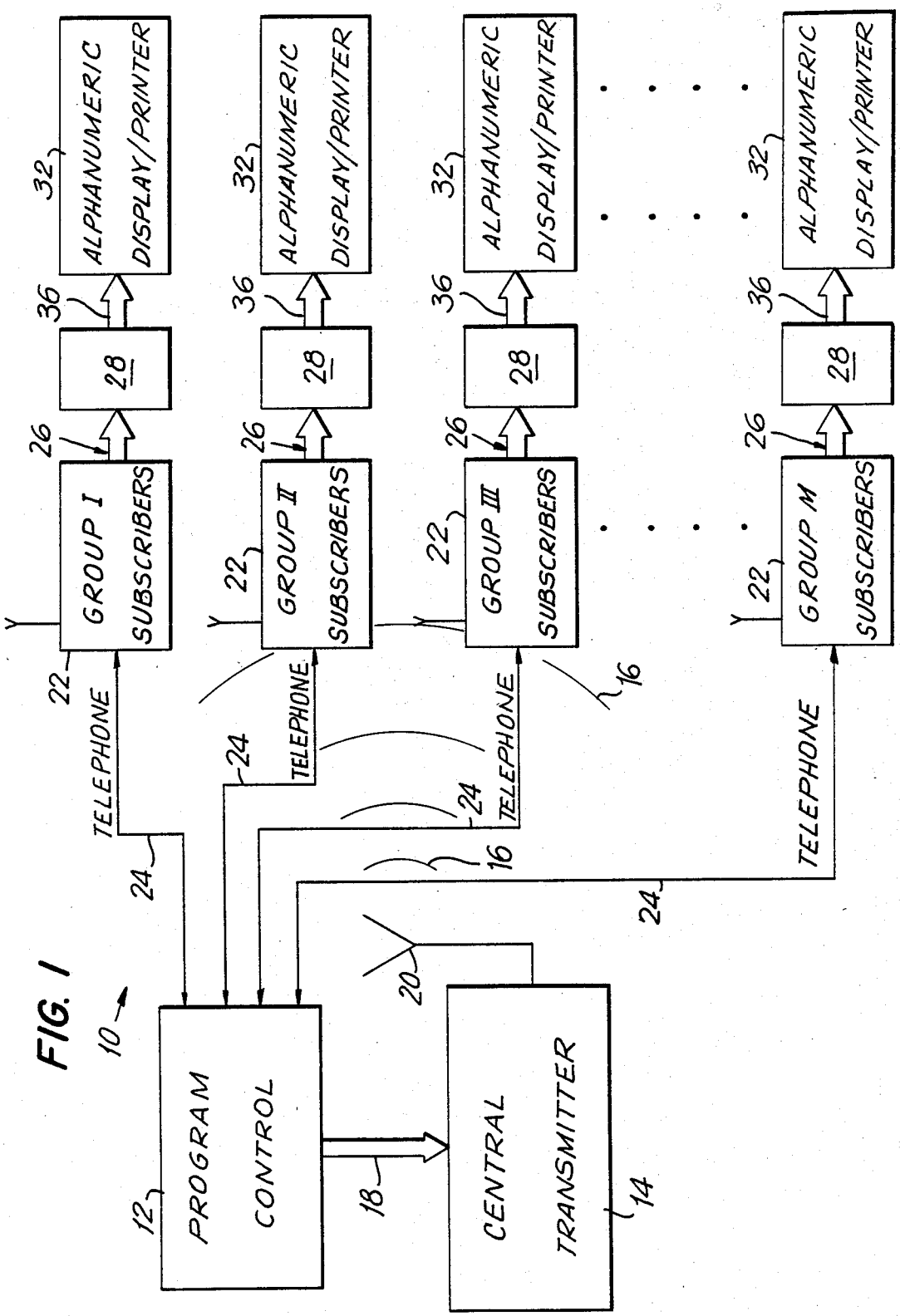

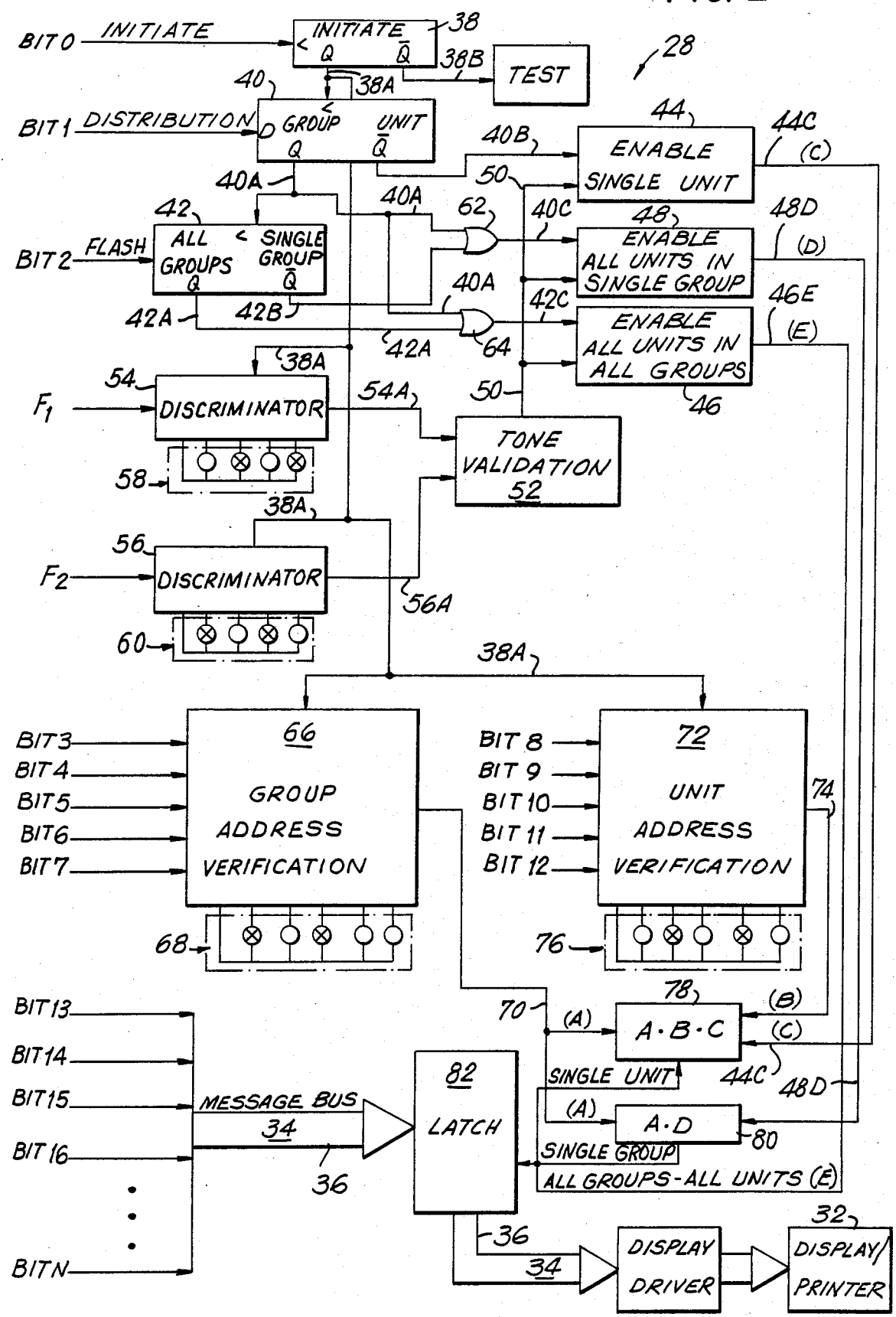

SUBSCRIBER INVENTORY NETWORK

FIELD OF THE INVENTION

This invention relates generally to communication networks, and in particular to an interactive subscriber inventory network for selectively disseminating data from a central source to predetermined receiving units in one or more subscriber groups.

BACKGROUND OF THE INVENTION

In the operation of an orderly market, buyers and sellers must have easy access to product information including price, availability and delivery terms. These needs are met by automated trading exchanges which have a central processor associated with one or more remote terminals that provide market information to members of the exchange upon request, and which permit members to make known their current inventory of available products and current product needs. In this interactive arrangement, both buyers and sellers play an active role in establishing a fair market value for various products which accurately reflects actual supply and demand information, which is available to all members. In this arrangement, a fair price is arrived at by the competition of well informed rival buyers and well informed rival sellers of the same products.

DESCRIPTION OF THE PRIOR ART

The following patents are representative of conventional automated market information systems:

| | | |
|---|---|---|
| 3,976,840 | 3,757,089 | 3,573,739 |
| 4,554,418 | 4,423,287 | 4,473,824 |
| 4,114,139 | 3,611,294 | 4,317,957 |
| 3,716,835 | 4,521,857 | 3,573,747 |
| 3,376,509 | 4,007,443 | 3,387,268 |
| 3,823,387 | 3,500,327 | 3,248,700 |

The automated market information systems represented by the foregoing patents provide many advantages to merchants and traders including making known information regarding current inventory availability and specific needs among the respective members of a market who are otherwise isolated from one another. There is a continuing interest in improving interactive market network systems in which market information is disseminated quickly and efficiently among all members.

SUMMARY OF THE INVENTION

Efficient dissemination and rapid exchange of information between members of a subscriber inventory network are provided according to the present invention by a communications network including a program control station, a central transmitter which transmits encoded message and address information, and a number of subscriber receiver stations located within an area in which encoded message transmissions can be received. Each subscriber station includes a receiver and an alphanumeric display or printer. Additionally, each subscriber station is linked to the program control station by a private, two-way communication channel, for example a telephone line.

Members of the subscriber network are arranged in separate groups, with the member subscribers in each separate group being pre-qualified with respect to certain exclusive inventory categories. The receiver of each subscriber is selectively enabled to receive only those messages which are related to the designated inventory category, with all other messages being excluded. Changes in a subscriber's current inventory are communicated to the program control over the private, operator two-way communication channel. Acting through a Radio Common Carrier (RCC), the program control operator causes a central transmitter to broadcast an updated inventory message which is received by all subscribers who are pre-qualified with respect to that particular inventory category.

In the preferred embodiment, the program control station includes a central message generator for producing coded radio frequency message bits. Each message bit comprises a pair of tones with the upper tone indicating a first logic state and the lower tone indicating a second logic state. Each subscriber unit includes a receiver and message controller which decodes command, address and message data bits. Two bits are dedicated for command instructions, including a distribution bit, which directs message data to a single unit in a single group, and a flash bit, which directs the encoded message data to all units in a single member group, or alternatively, to all receiving units in all member groups. By this arrangement, specific inventory information can be directed to a particular receiving unit, or can be flashed to all members of a selected group, and information of general interest can be flashed to all receiving units in all member groups.

The novel features which characterize the invention are defined by the appended claims. The operation and advantages of the present invention will be appreciated by those skilled in the art upon reading the detailed description which follows with reference to the attached drawings.

BRIEF DESCRIPTION OF THE DRAWINGS

FIG. 1 is a simplified block diagram of a subscriber inventory network constructed according to the teachings of the present invention; and, FIG. 2 is a simplified block diagram of a message controller directs encoded messages transmitted by a program control station to specific subscriber units.

DESCRIPTION OF THE PREFERRED EMBODIMENT

Referring now to FIG. 1, a subscriber inventory network 10 includes a program control station 12 and a radio transmitter 14 which transmits a modulated signal 16 which corresponds with an encoded digital message 18 generated by an operator with the assistance of a computer accessed databank The modulation system is preferably carrier frequency shift keying (FSK-Digital).

The modulated signal 16 is transmitted at an assigned frequency in a selected RCC range, for example 30–50 MHz, 138–174 MHz or 420–512 MHz. The signal is radiated by an antenna 20 to several subscriber stations which are located within an area in which the modulated signal 16 can be received.

The member subscribers are arranged in groups designated Group I, Group II, Group III, . . . Group M. The subscribers in each group are pre-qualified with respect to certain inventory categories which are of common interest.

Each subscriber station includes a receiver 22 and a private telephone line connection 24 which permits discrete, two-way telephone calls between each subscriber station and the program control station 12.

Each receiver 22 which includes an intermediate frequency section which receives the modulated radio frequency transmission 16 from the central transmitter 14. The output of the intermediate frequency section is demodulated to yield audio tone signals which were initially generated by the program control station 12.

According to an important aspect of the invention, the modulated radio frequency signal includes N message bits, with each bit corresponding with a pair of tones, with the upper tone indicating a first logic state and the lower tone indicating a second logic state. Moreover, three sets of such tone pairs are utilized. The first set of tone pairs provides for detection of an initializer bit. The remaining two tone pairs are used for successive bits of the message. According to this arrangement, different tone pairs are associated with each pair of consecutive bits within the message.

The message is organized according to the following sequence of bits:
Bit 0: Start
Bit 1: Group/Unit Distribution
Bit 2: All Groups/Single Group
Bits 3-7: Group Address
Bits 8-12: Unit Address
Bits 13-N: Message Data According to the foregoing arrangement, separate groups for thirty-two different inventory categories can be established, and within each group, thirty-two sub-classifications corresponding with separate receiving units can be established. By utilizing all group identification numbers and all available subscriber addresses within each zone, the subscriber inventory network 10 can have as many as 1,024 individual unique subscriber identification addresses. The network can be expanded by assigning the same group and unit address identification to two or more subscriber units, for example multiple receiving units in the same group which are used by a single business entity.

After the modulated signal 16 has been demodulated, corresponding message bits are generated with a first set of tone pairs representing the initializer bit, and with second and third tone pairs representing the remaining successive bits. According to this arrangement, each message is initiated with the tone from a first tone pair, and the tone selected from the first tone pair is used only as the first bit in the message and is not used in any subsequent bit of the message. For each successive bit there is another pair of tones with the upper tone indicating a first logic state and the lower tone indicating a second logic state in each tone pair. The tones for bits which follow sequentially from the initializer bit are selected alternately between the second and third tone pairs, with all of the tones in the first, second and third tone pairs being different from each other. Preferably, the frequencies of tones in each tone pair are selected from the audio range, for example 300 Hz to 1,200 Hz.

From these dual tone bits, a digital data signal 26 is derived in which a logic high voltage level corresponds with a high tone frequency and a logic low voltage level corresponds with a low tone frequency for each tone pair. By detecting the logic high frequency and the logic low frequency of each bit simultaneously, the digital message can be received without the need of synchronous timing for the message data bits.

The demodulated digital data signal 26 is input to a message controller 28 which directs the encoded message bits to a specific group and unit address according to information contained within the command bits, distribution bit 1 and flash bit 2. The message bits, bit 13 —bit N, are referred to collectively as the message data signal 34, and are conducted by a message bus 36 to an alphanumeric display/printer 32.

Referring now to FIG. 2, the message controller 28 is responsive to the initializer bit 0, the distribution bit 1, and the flash bit 2 for selectively directing the message data bits 13—N to a single receiving unit in a single group, or to all units of a single member group, or alternatively, to all receiving units and to all member groups. A specific unit will receive the message data signal 34 only when an appropriate identification of group address and unit address has been transmitted.

The reception of a logic high for initializer bit 0 starts the message reception sequence. The reception of a logic low for the initializer bit starts an internal test routine. The initializer bit 0 sets up the controller 28 to process the command and address bits which follow sequentially. The initializer bit also serves as a framing bit to separate successive message transmissions The second bit, bit 1, is a command bit which instructs the controller to distribute the message bits 13—N to one or more groups or to a single unit. The initializer bit 0 is applied to the trigger input of an initializer latch 38. The command distribution bit 1 is input to the D input terminal of a DQ flip-flop 40. The DQ flip-flop 40 is triggered by the rising edge of the logic high Q output of the initializer latch 38. A logic high value of bit 0 is output through the Q terminal of latch 38 as an input to the distribution flip-flop 40. A logic 0 value for initializer bit 0 is output through the complement data output $\overline{Q}0$ which initializes an internal test routine.

The DQ flip-flop 40 is triggered by the rising edge of a logic high output from the initializer latch 38. A logic high value for distribution bit 1 appears as a logic 1 value at the Q output of flip-flop 40, identified as logic signal 40A, which is input to a D type flip-flop 42 which implements group flash commands. A logic 0 value for bit 1 appears on the complement output terminal $\overline{Q}$, which implements a unit address command 40B and which forms one input to an AND gate 44. When both inputs of AND gate 44 are logic high, a single unit address is commanded through an enabling signal 44C.

A logic high value for command group signal 40A triggers the D type flip-flop 42 whereby a logic high value for flash command bit 2 is applied as a logic high command signal 42A to one input of an AND gate 46. A logic low value for flash command bit 2 is applied through the complement data terminal $\overline{Q}0$ of D flip-flop 42 and is applied as one input of an AND gate 48.

When both inputs of AND gate 44 are logic high, a single receiver unit is enabled through command logic signal 44C. Likewise, when both inputs of AND gate 46 are logic high, all units in all groups are enabled through a command logic signal 46E. Moreover, when both inputs of the AND gate 48 are logic high, all receiving units in a single group are enabled through a command logic signal 48D.

The logic circuitry as shown on FIG. 2 incorporates a mutually exclusive feature which will permit one and only one of the AND gates to have both inputs logic high at the same time. A common input to each of the AND gates 44, 46 and 48 is a tone validation logic signal 50 which is the output of a tone validation gate 52.

Because of noise and harmonics, it is possible that the logic value of one of the message bits may be incorrect. The tones associated with the logic high and logic low values of one tone pair used in either the distribution bit or the flash bit are compared separately in discriminator circuits 54, 56, respectively. The input of discriminator 54 is a signal $F_1$ having a frequency corresponding to the frequency of the first tone, and the input to discriminator 56 is a signal $F_2$ having a frequency corresponding to the frequency of the second tone in the selected tone pair. In each discriminator, a count of the frequency is determined and a digital data word is produced which corresponds with that count. The produced digital data word corresponding with the frequency is compared with a preprogrammed frequency identifier number as established by a group of manually set switches 58, 60, respectively. A match between the produced frequency count and the pre-programmed frequency identifier number produces logic high outputs 54A, 56A, respectively which are applied as inputs to the tone validation gate 52.

According to this arrangement, a precondition for the of a group address command or a unit address command is a logic high tone validation signal 50.

Assuming that the tones are valid, one and only one of the AND gates 44, 46 and 48 will provide a logic high output in response to a distribution and/or flash command. The exclusive selection of only a single unit address, or all units in a single group, or all units in all groups is made possible by the logic circuitry interposed between the distribution flip-flop 40, the flash flip-flop 42 and the AND gates 46, 48.

The Q output terminal of distribution flip-flop 40 is combined with the complement data output terminal $\overline{Q}$ of flash flip-flop 42 to insure that a logic high command signal 40C is input to all unit/single group AND gate 48 if and only if the Q output of distribution flip-flop 40 is logic high and the $\overline{Q}$ output of flash flip-flop 42 is logic high. This could only occur with a logic 0 appearing on the complement output $\overline{Q}$ of the distribution flip-flop 40 which would produce a logic 0 value for the output signal 44C of single unit AND gate 44. Assuming that a logic 0 value appears at bit 2 for the flash command, the all group output terminal Q will be logic 0 and its complement output $\overline{Q0}$ for the single group selection will be logic high.

The command output signals 40A, 42A are combined in an AND gate 62 to produce a conditional command signal 40C only when both inputs are at logic high value. Thus, when both inputs to all unit/single group AND gate 48 are logic 1, an all unit/single group enabling signal 48D will be produced. The command enabling signal 44C will be logic 0, since the input 40B to the single unit AND gate 44 is logic 0. Likewise, the command output 46E produced by all unit/all group AND gate 46 is logic 0 because one of its inputs, all group command 42A is logic 0.

The all group command signal 42A is combined with group command signal 40A in an AND gate 64. The conditional command output 42C of AND gate 64 is a logic 1 if and only if both of its inputs are logic 1. Therefore, conditional command 42C is logic 0 when its input all group command 42A is logic 0. Accordingly, only the all unit/single group command 42D assumes a logic 1 value when distribution command bit 1 is logic 1 and flash command bit 2 is logic 0. It will be appreciated, therefore, that every possible logic value combination for command bits 1 and 2 can be processed at any time, but with only one unique enabling command being generated.

A group address appearing on bit 3-bit 7 is verified in a comparator 66. The comparator 66 includes a pre-programmed five bit group address identifier, which consists of five manually set switches 68. The logic value of each group address bit is compared with the logic value represented by the switches in switch array 68. If the logic values associated with the group address bits 3-7 correspond with the pre-programmed identifier, a logic high value is produced for group address verification signal 70.

A similar comparison of the unit address on bits 8-12 is performed in a comparator 72, which produces a logic high value for a unit address verification signal 74 when the logic values associated with bits 8-12 correspond with the logic values represented by a pre-programmed unit address identifier number manually set in a switch array 76.

The group address verification signal 70 and the unit address verification signal 74 are used as inputs to AND gates 78, 80 for selectively gating the message bits 36 to a specific group or a specific unit only for valid group addresses and valid unit addresses.

That is, a message 36 will be passed to a specific receiving unit if and only if the unit's group address has been verified, the unit's specific address has been verified and the single unit enable command signal 44C is logic high. When all of the inputs of AND gate 78 are logic high, its output, designated SINGLE UNIT, is logic high and is applied as an enabling signal to a message latch 82. The message bits are passed to the display/printer 32 along message bus 34 in response to a logic high value for one of the three enabling commands, SINGLE UNIT, SINGLE GROUP, or ALL GROUPS/ALL UNITS.

The message 36 will be passed to all units of a single group upon the condition that a valid group address has been received in comparator 66, and the all units/single group enabling signal 48D is logic high. All groups and all units will be addressed upon the condition that the all units/all group enable signal 46E is logic high, independently of group address and unit address verification.

The message controller 28 is therefore capable of directing a message exclusively to a single receiving unit within any of the various subscriber Groups I—M. Additionally, a message can be addressed to all units of a single subscriber group without being disseminated to receiving units in other groups. Finally, messages of general interest can be communicated to all units in all groups.

Exclusive message allocation to any single unit, any single group and all groups is implemented with only two command bits. Accordingly, it will be appreciated that the subscriber inventory network 10 improves communications between buyers and sellers by disseminating market information quickly and efficiently among all members, with members receiving only those messages which have been prequalified according to inventory category.

The message controller logic permits the subscriber inventory network 10 to restrict messages by various product category, style, age and price. The customer database within the subscriber inventory network defines the customer type, customer business location, merchandise/product type, buying price ranges, and product age. Such factors are used by the program controller to determine the identification of customers who would be potential buyers or sellers of any inventory item that is offered or requested by a member unit.

Any subscriber of the inventory network 10 can call the program controller on the telephone line 24 and submit a subscriber request. After receiving the necessary information about the subscriber's buy or sell request, all subscribers who have a potential interest in the request are identified from the records of a computer databank. The group and unit addresses for the subscribers who are identified as being interested in the particular customer request are downloaded through the program control computer, which generates a message which includes the appropriate command bits, group address bits, and unit address designations. The encoded message is then transmitted through the transmitter 14 which is operated by a radio common carrier (RCC).

All pre-qualified subscribers will receive the message through their receiving unit, which may be an alphanumeric pager or a receiver which is coupled to a visual display unit and/or printer. After receiving the message, the pre-qualified subscriber has information needed to make a quick decision regarding his interest in making contact with the sending subscriber. If no response is received by the sending subscriber, the message may be re-transmitted to the same group or to a different group of subscribers.

Although a preferred embodiment of the invention has been described in detail, it should be understood that various changes, substitutions and alterations can be made therein without departing from the spirit and scope of the invention as defined by the appended claims.

What is claimed is:

1. A subscriber inventory network for selectively disseminating messages to receiving units of one or more subscriber groups comprising:

a central message generator and transmitter for transmitting coded messages, each message including an initializer bit, a plurality of command bits, a plurality of group address bits, a plurality of unit address bits, and a plurality of message data bits, with each command bit and address bit having a first logic state and a second logic state;

at least one receiver in each group being responsive to said coded messages transmitted by said central message generator, each receiver including means for responding to command bits in said message from said transmitter received by said receiver;

each of said receivers having a pre-programmed group code identifier and a pre-programmed unit address identifier; and each of said receivers including a message controller for receiving the message bits and for selectively communicating the message bits to a single unit of a single group, all units of a single group, or all units of all groups according to logic values associated with said command bits, respectively;

wherein said command bits include a group/unit distribution bit and an all group/single group flash command bit, said distribution command bit and said flash command bit being applied to first and second D flip-flops, respectively, with the distribution flip-flop being actuated by the initializer bit, and with the flash command flip-flop being actuated by the Q output of said distribution flip-flop;

the data output Q of the distribution flip-flop providing an enabling signal for the flash command flip-flop, and the complementary data output $\overline{Q}0$ of the distribution flip-flop providing an enabling signal for enabling a single receiving unit;

the data output Q of the flash command flip-flop providing an enabling signal for all units/all groups, and the complementary data output $\overline{Q}0$ of the flash command flip-flop providing an enabling signal for all units in a single group;

the data output Q of the distribution command flip-flop being combined with the complementary data output $\overline{Q}0$ of the flash command flip-flop in a first AND gate, thereby producing a conditional enabling signal for all units in a single group; and the data output Q of the distribution command flip-flop being combined with the data output Q of the flash command flip-flop in a second AND date for producing a conditional enabling signal for all units and all groups when both data output Q signals of the distribution command flip-flop and the flash command flip-flop are logic high.

* * * * *